United States Patent Office 2,773,091
Patented Dec. 4, 1956

---

2,773,091

FLUORANTHENEOXOCARBOXYLIC ACIDS AND THE PRODUCTION THEREOF

Robert R. Burtner, Skokie, Ill., assignor, by mesne assignments, to G. D. Searle & Co., Skokie, Ill., a corporation of Delaware No Drawing. Application October 12, 1953, Serial No. 385,673

10 Claims. (Cl. 260—515)

This invention relates to oxoalkanoic and -alkenoic carboxylic acid derivatives of fluoranthene, to salts thereof, and to processes for the preparation of these carboxylic acid derivatives and their salts. In particular, this invention relates to compounds of the formula

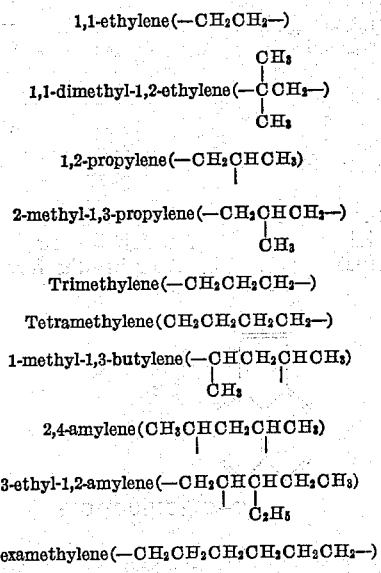

wherein R is a bivalent, aliphatic, hydrocarbon radical containing at least two and not more than 8 carbon atoms, and Z is hydrogen or one equivalent of a cation.

This application is a continuation-in-part of my application Serial No. 208,241, filed January 27, 1951, which in turn is a continuation-in-part of my application Serial No. 26,710, filed May 12, 1948, both now abandoned.

In the foregoing structural formula, R represents an alkylene radical, said alkylene radical being defined as a bivalent, saturated, acyclic, straight- or branched-chain hydrocarbon radical of empirical formula $$C_nH_{2n}$$

wherein $n$ is a positive integer greater than one and less than nine. The alkylene radicals comprehended by R as hereinabove defined include, for example, 1,1-ethylene ($-CH_2CH_2-$)

1,1-dimethyl-1,2-ethylene ($-\underset{\underset{CH_3}{|}}{\overset{\overset{CH_3}{|}}{C}}CH_2-$)

1,2-propylene ($-CH_2\underset{|}{C}HCH_3$)

2-methyl-1,3-propylene ($-CH_2\underset{\underset{CH_3}{|}}{C}HCH_2-$)

Trimethylene ($-CH_2CH_2CH_2-$)

Tetramethylene ($CH_2CH_2CH_2CH_2-$)

1-methyl-1,3-butylene ($-\underset{\underset{CH_3}{|}}{C}HCH_2\underset{|}{C}HCH_3$)

2,4-amylene ($CH_3\underset{|}{C}HCH_2\underset{|}{C}HCH_3$)

3-ethyl-1,2-amylene ($-CH_2\underset{|}{C}H\underset{\underset{C_2H_5}{|}}{C}HCH_2CH_3$)

Hexamethylene ($-CH_2CH_2CH_2CH_2CH_2CH_2-$)

and

Octamethylene ($-CH_2CH_2CH_2CH_2CH_2CH_2CH_2CH_2-$)

as well as such other alkylene radicals as fall within the purview of the aforesaid definition and terms. Alternatively, R represents an alkenylene radical, said radical being defined—for the purposes of this invention—as a vinylene ($-CH=CH-$) radical, or a bivalent, acyclic, straight- or branched-chain hydrocarbon radical derived from alkylvinylene radicals and having the empirical formula $$C_nH_{2n-2}$$

wherein $n$ has the meaning assigned above. R is thus seen to embrace such radicals as 1,3-propenylene ($-CH_2CH=CH-$)

2-methyl-1,3-propenylene ($-CH_2\underset{\underset{CH_3}{|}}{C}=CH-$)

1,4-pentenylene-1 ($-CH=CH\underset{|}{C}H_2CHCH_3$)

and the like. Z represents hydrogen or one equivalent of a cation as remarked, and includes ions of the alkali and alkaline earth metals, as also the ammonium and various amine ions.

The compounds of this invention are useful in medicine as choleretics. Distinct from cholagogs, which merely promote expulsion of stored bile from the gall bladder, the subject materials have the property of augmenting the volume output of bile from the liver, by virtue of which action they are of great value in the non-surgical treatment of those common pathological conditions of the biliary tract where flushing and drainage are indicated.

The compounds to which this invention relates are prepared by reacting fluoranthene with an acid anhydride or an acid halide derived from a dibasic aliphatic acid of the formula

HOOC—R—COOH

—such as succinic, pyrotartaric, glutaric, adipic, suberic, sebacic, α,β-diethylsuccinic, α-methyladipic, and related acids—in the presence of a Friedel-Crafts catalyst, using an inert solvent. Among the Friedel-Crafts catalysts which are suitable for the subject processes are anhydrous aluminum chloride, anhydrous ferric chloride, anhydrous zinc chloride, stannic chloride, anhydrous aluminum bromide, boron trifluoride, hydrogen fluoride, and the like. Solvents suitable for the reaction include benzene, chlorobenzene, nitrobenzene, carbon disulfide, tetrachloroethane, and related organic liquids which are lower in reactivity than fluoranthene. In practice, it is preferred to employ for each mole of fluoranthene approximately 1 mole of acid anhydride or acid halide and more than 2 moles of Friedel-Crafts catalyst, preferably about 2.2 moles of catalyst. The reactions take place at temperatures between 0 and 100° centigrade over periods of time ranging upward from 1 hour. One preferred combination of temperature and time comprises 2-3 hours at 5°±5° centigrade, followed by a 15-hour standing period at room temperatures.

Salts of the oxo acids which are within the scope of this application can be prepared by neutralization of the acids with organic or inorganic bases such as sodium carbonate, sodium hydroxide, potassium bicarbonate, calcium hydroxide, ammonium hydroxide, and ammonium carbonate; methylamine, dimethylamine, ethylamine, and related mono-, di- and trialkylamines; alkanolamines such as ethanolamine, isopropanolamine, triethanolamine, and diethylaminoethanol; and strong heterocyclic amines which are aliphatic in character, including morpholine, piperidine, and related substances. Neutralizations are preferably, though not necessarily, carried out in an alcohol solution, which—by evaporation of the solvent or precipitation of the solute as a result of the addition of a miscible liquid in which the said solute is insoluble—is conveniently adapted for isolation of the desired product. The oxo acids which comprise this invention are relatively insoluble in water, but may be dissolved in aqueous alkali and in most of the common organic solvents. The salts of this invention are, on the other hand, for the most part readily soluble in water and in aqueous solutions of alcohols or other water-miscible organic solvents. The subject compounds may be administered in solid form as tablets or capsules; dissolved or suspended in aqueous media, they may be given parenterally.

The following examples will illustrate in detail certain of the fluoranthene compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

$\gamma$-Oxo-$\gamma$-fluoranthenebutyric acids.—To a suspension of 95 parts of fluoranthene and 50 parts of succinic anhydride in 400 parts of benzene is added, with agitation and during 30 minutes, 150 parts of anhydrous aluminum chloride. The temperature rises to about 55° C. in process. After the addition is complete, the suspension is agitated for 15 minutes and then refluxed for 1 hour. The reaction mixture is allowed to stand for 15 hours, following which it is quenched in 1000 parts of ice containing 236 parts of concentrated muriatic acid. Solvent is removed by steam distillation and the precipitated $\gamma$-oxo-$\gamma$-fluoranthenebutyric acids thereupon removed from the hot distilland by filtration. The crude acids are taken up in 2000 parts of water, at 85° C., containing 40 parts of caustic soda. Filtration of the hot solution, followed by cooling and acidification, in that order, affords a precipitate of $\gamma$-oxo-$\gamma$-fluoranthenebutyric acids which granulates on drying and standing. Purification is achieved by recrystallization from acetic acid, using decolorizing charcoal in process. The material thus obtained—which shows M. P. 178–179° C.—is a mixture of $\gamma$-oxo-$\gamma$-3-fluoranthenebutyric acid, the formula of which is

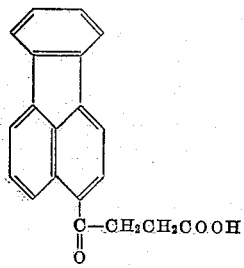

and $\gamma$-oxo-$\gamma$-8-fluoranthenebutyric acid, the formula of which is

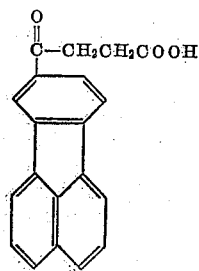

Example 2

$\gamma$-Oxo-$\gamma$-3-fluoranthenebutyric acid and $\gamma$-oxo-$\gamma$-8-flouranthenebutyric acid.—To an agitated suspension of 101 parts of fluoranthene and 50 parts of succinic anhydride in 600 parts of nitrobenzene at 0–5° C. is slowly added 134 parts of anhydrous aluminum chloride. The reaction mixture is stirred for 4 hours longer at about 5° C. and then allowed to stand at room temperature for about 15 hours. It is decomposed with an excess of ice and muriatic acid, whereupon the solvent is removed by steam distillation. The distilland is chilled and the gummy precipitate then isolated therefrom by filtration. This material is washed by trituration with water, collected on a filter, and rinsed thereon with water, in that order. It is then taken up in 2000 parts of 3% aqueous sodium carbonate solution at about 90° C. The hot solution is, successively, treated with activated carbon, filtered, cooled, and acidified. The material thus precipitated is collected on a filter, washed thoroughly thereon with water, and finally dried at about 80° C. It melts at 182–186° C. and consists of a mixture of $\gamma$-oxo-$\gamma$-3-fluoranthenebutyric acid and $\gamma$-oxo-$\gamma$-8-fluoranthenebutyric acid.

Approximately 158 parts of this material is dissolved in 2000 parts of water containing 82 parts of sodium carbonate at 60° C. The resulting solution is diluted with 4300 parts of water and then allowed to stand overnight. The cooled solution is filtered and the filtrate acidified, thereupon precipitating material which, isolated and dried, is taken up in 695 parts of methyl acohol containing 76 parts of concentrated sulfuric acid. This solution is agitated and refluxed for 16 hours. There are formed an insoluble fraction (I) and a soluble fraction (II).

The insoluble fraction (I) is twice recrystallized from ethyl acetate, using decolorizing charcoal in process, to give a bright yellow product which, crystallized yet a third time from ethyl acetate, shows M. P. about 131–131.5° C. This is the methyl ester of $\gamma$-oxo-$\gamma$-8-fluoranthenebutyric acid and has the formula

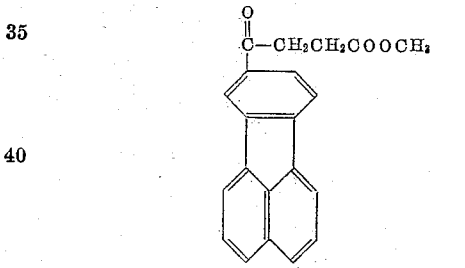

This ester is saponified by refluxing for 1.5 hours with 6% alcoholic potash. Approximately half the alcohol is stripped in vacuo; and the residue is then diluted with water and, finally, acidified. The precipitate of $\gamma$-oxo-$\gamma$-8-fluoranthenebutyric acid thus obtained is collected on a filter, washed thereon with water, and dried, in that order. Crystallized from acetic acid, it is lemon yellow in color and shows M. P. approximately 208° C.

The hot methanolic filtrate (II) is chilled, whereupon a crystalline yellow precipitate melting at about 100° C. separates. This material is crystallized from methyl alcohol—using decolorizing charcoal in process—to give bright yellow crystals of a product, M. P. 104–105° C., the principle constituent of which is methyl $\gamma$-oxo-$\gamma$-3-fluoranthenebutyrate. This ester has the formula

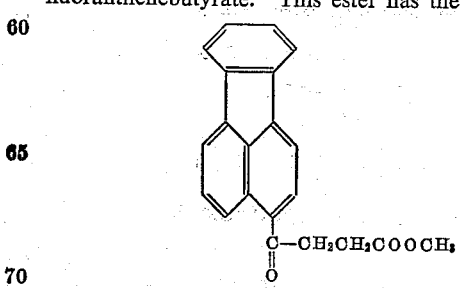

It is saponified with 6% alcoholic potash by the same technique used for cleavage of the 8-isomer. The material thus obtained—which is chiefly $\gamma$-oxo-$\gamma$-3-fluoranthenebutyric acid containing, apparently, a small amount of the 8-isomer as an impurity—is crystallized from acetic acid to give a product which liquifies at about 184° C. and does not melt completely until about 200° C.

Example 3

δ-*Oxo-δ-8-fluoranthenevaleric acid.*—To a stirred solution of 65 parts of glutaric anhydride and 115 parts of fluoranthene in 685 parts of nitrobenzene at 5–10° C. is added, portion-wise, 152 parts of anhydrous aluminum chloride. The reagents are agitated for 3 hours at approximately 0° C. and then allowed to warm to room temperature over 15 hours. The reaction mixture is hydrolyzed with an excess of ice and muriatic acid, and solvent is then removed by steam distillation. The distilland is cooled and the supernatant liquor thereupon decanted from the dark solid residue. The residue is triturated with water, separated by filtration, and then taken up in 2000 parts of 2% aqueous potash at about 60° C., in that order. The solution is filtered, using a diatomaceous earth as an aid in process, and the filtrate is made acid. A brown granular solid precipitates. This material—crude δ-oxo-δ-8-fluoranthenevaleric acid— is esterified by refluxing with a mixture of 600 parts of methyl alcohol and 80 parts of concentrated sulfuric acid for 15 hours. A viscous solid forms during the esterification process. The hot methanolic supernatant is decanted therefrom and then chilled, precipitating the crude methyl ester of δ-oxo-δ-8-fluoranthenevaleric acid which, crystallized from 4 volumes of ethyl acetate (using decolorizing charcoal in process), shows M. P. approximately 112° C. This, the pure methyl ester is obtained in the form of bright yellow needles. It has the formula

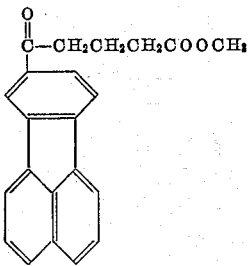

Saponification is effected by refluxing the foregoing material with 3 parts of potash in approximately 25 parts of methyl acohol for 45 minutes. The reaction mixture is then poured into 300 parts of water, and subsequently acidified. The pure δ-oxo-δ-8-fluoranthenevaleric acid thus obtained shows M. P. 173–174° C. Crystallization from acetic acid does not alter this melting point. This material has the formula

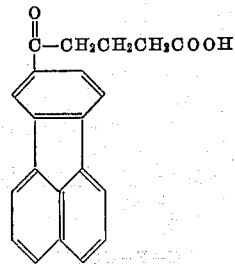

Example 4

ω-*Oxo-ω-8-fluoranthenecaproic acid.*—To a stirred solution of 101 parts of fluoranthene and 90 parts of ω-carbomethoxyvaleryl chloride in 600 parts of nitrobenzene at 0–5° C. is added 67 parts of anhydrous aluminum chloride. The reagents are agitated for 1½ hours at approximately 0° C. and then allowed to stand at room temperature for 15 hours. Following hydrolysis with ice and muriatic acid, the reaction mixture is steam distilled to remove solvent. The distilland is cooled and supernatent liquor decanted therefrom leaving the dark viscous reaction product as a residue. This is taken up in ether; and the ether solution is then washed with water, dried over anhydrous sodium sulfate, and stripped of solvent, in that order. The residue is esterified by refluxing for 24 hours with a mixture of 525 parts of methyl alcohol and 61 parts of concentrated sulfuric acid. The bulk of the solvent is distilled off in vacuo and the residue then taken up in ether. The ether solution is washed, successively, 3 times with 5% aqueous caustic soda, using 200 parts of the dilute alkali for each washing operation, and once with water. The solution is next dried over anhydrous sodium sulfate and finally stripped of solvent. Dimethyl adipate is removed from the residue thus obtained by heating at approximately 90° C. and 0.5 mm. pressure for 2 hours. The residue is then extracted with approximately 1200 parts of boiling methyl alcohol in 4 equal portions. The extracts are combined and concentrated to about one-fifth their original volume, whereupon the concentrate is chilled to precipitate the desired methyl ester of ω-oxo-ω-8-fluoranthenecaproic acid as a bright yellow solid. It has the formula

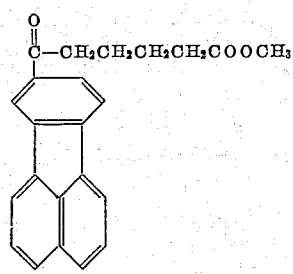

The ester is saponified by refluxing for 1 hour with a mixture of 20 parts of caustic soda and 200 parts of methyl alcohol. Approximately 2000 parts of water is then added; and the resultant alkaline solution is washed twice with ether, then heated at the boiling point with decolorizing charcoal, filtered, cooled, and acidified, in that order. The desired acid, precipitated in process, granulates on standing. Isolated on a filter, then rinsed with water, and finally dried, the material is crystallized from 4 volumes of acetic acid. Its melting point is 145–146° C. Crystallization from 30 volumes of toluene fails to improve this melting point. The yellow ω-oxo-ω-8-fluoranthenecaproic acid thus obtained has the formula

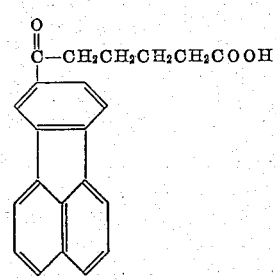

Example 5

α,β-*Dimethyl-γ-oxo-γ-8-fluoranthenebutyric acid.*—By the condensation of α,β-dimethylsuccinic anhydride with fluoranthene according to the procedure of Example 2, there is produced α,β-dimethyl-γ-oxo-8-fiuoranthene-butyric acid, having the formula

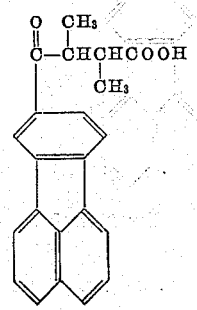

Example 6

*ω-Oxo-ω-8-fluoranththenecapric acid.*—This material is obtained by the reaction of fluoranthene with sebacic anhydride. It has the formula

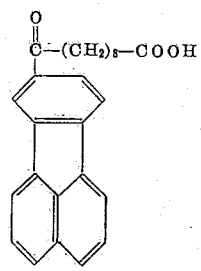

Example 7

*β-Ethyl-δ-oxo-δ-8-fluoranthenevaleric acid.*—By interaction of β-ethylglutaric anhydride and fluoranthene in accordance with the technique of Example 2, there is formed β-ethyl-δ-oxo-δ-8-fluoranthenevaleric acid of the formula

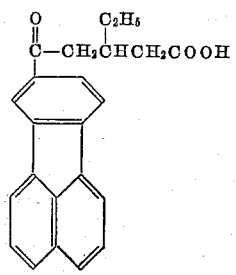

Example 8

A. *β-Bromo-γ-oxo-γ-8-fluoranthenebutyric acid.*—To an agitated suspension of 45 parts of γ-oxo-8-fluoranthenebutyric acid in 450 parts of glacial acetic acid at 60° C. is added over a 35 minute period, 24 parts of bromine in 75 parts of acetic acid. The reaction mixture is agitated for 20 minutes longer, and the solvent is then stripped in vacuo. The residue of β-bromo-γ-oxo-γ-8-fluoranthenebytric acid is crystallized by trituration in petroleum ether, then, successively, filtered, washed with petroleum ether, and dried.

B. *γ-Oxo-γ-8-fluoranthenecrotonic acid.*—A mixture of 54 parts of the bromo acid of the foregoing Part A and 17 parts of fused sodium acetate in 165 parts of glacial acetic acid is refluxed for 30 minutes. The reaction mixture is thereupon chilled and then poured into 1000 parts of cold water, precipitating γ-oxo-γ-8-fluoranthenecrotonic acid, which granulates on standing. The product is collected on a filter, triturated with water, filtered, and dried, in that order. Upon crystallization from acetic acid, it shows M. P. approximately 191° C. The bright yellow γ-oxo-γ-8-fluoranthenecrotonic acid thus obtained has the formula

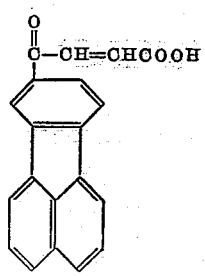

Example 9

*Fluoranthene-8-carboxylic acid.*—To a solution of 50 parts of γ-oxo-γ-8-fluoranthenebutyric acid—prepared as in Example 2 and melting at about 208°C.—in 3200 parts of water containing 100 parts of caustic soda is added 1700 parts of 5.25% aqueous sodium hypochlorite solution, with good agitation. The reaction mixture is heated at 60° C. for 20 minutes, then at 90–95° C. for 30 minutes. It is thereupon cooled to room temperature and the brown precipitate formed in process then collected on a filter. This material is taken up in 150 parts of 2% aqueous caustic soda at 90° C. Clarification of this solution, using diatomaceous earth as a filter aid, followed by acidification of the filtrate with dilute mineral acid and subsequent cooling, causes precipitation of a product which, crystallized from acetic acid, shows M. P. approximately 291° C. The material forms an ethyl ester which, after recrystallization from petroleum ether, melts at 89–900° C. This material is fluoranthene-8-carboxylic acid, having the formula

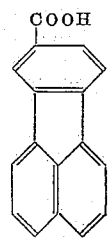

I claim:

1. An ω-oxo-ω-8-fluoranthenecarboxylic acid derivative of the formula

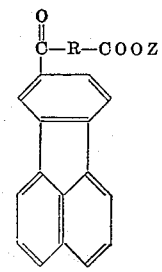

wherein R is selected from the group consisting of bivalent, saturated, acyclic, hydrocarbon radicals of empirical formula $$C_nH_{2n}$$

and bivalent, unsaturated, acyclic, hydrocarbon radicals of empirical formula $$C_nH_{2n-2}$$

n in the preceding empirical formulas being a positive integer greater than 1 and less than 9, and Z is selected from the group consisting of hydrogen and one equivalent of a cation.

2. An ω-oxo-ω-8-fluoranthenealkanoic acid of the formula

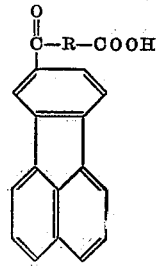

wherein R is an alkylene radical containing at least two and not more than eight carbon atoms.

3. γ-Oxo-γ-8-fluoranthenebutyric acid.
4. δ-Oxo-δ-8-fluoranthenevaleric acid.
5. ω-Oxo-ω-8-fluoranthenecaproic acid.

6. An ω-oxo-ω-8-fluoranthenealkanoic acid of the formula

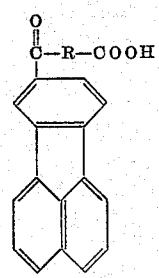

wherein R is an alkenylene radical containing at least two and not more than eight carbon atoms.

7. γ-Oxo-γ-8-flouranthenecrotonic acid.

8. The process of manufacturing an ω-oxo-ω-8-fluoranthenecarboxylic acid derivative of the formula

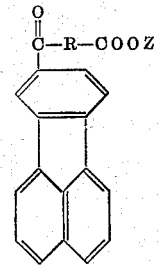

wherein R is selected from the group consisting of bivalent, unsaturated, acyclic, hydrocarbon radicals of empirical formula

$C_nH_{2n}$ and bivalent, unsaturated, acylic, hydrocarbon radicals of empirical formula

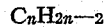

$C_nH_{2n-2}$ n in the preceding empirical formulas being a positive integer greater than one and less than nine, and Z is selected from the group consisting of hydrogen and one equivalent of a cation, which comprises reacting fluoranthene with a member of the group consisting of acid halides and acid anhydrides derived from a dibasic acid of the formula

HOOC—R—COOH wherein R has the meaning assigned above, in the presence of a Freidel-Crafts catalyst in an inert solvent, and isolating from the reaction mixture the oxofluoranthenecarboxylic acid formed.

9. The process of manufacturing an ω-oxo-ω-8-fluoranthenealkanoic acid of the formula

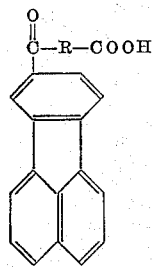

wherein R is an alkylene radical containing at least two and not more than eight carbon atoms which comprises reacting fluoranthene with the anhydride of a dibasic acid of the formula

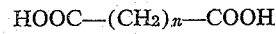

HOOC—(CH$_2$)$_n$—COOH wherein n is a positive integer greater than one and less than nine in an inert solvent in the presence of anhydrous aluminum chloride, and isolating from the reaction mixture the ω-oxo-ω-8-fluoranthenealkanoic acid formed.

10. The process of manufacturing γ-oxo-γ-8-fluoranthenebutyric acid which comprises reacting fluoranthene with succinic anhydride in the presence of anhydrous aluminum chloride in an inert solvent, and isolating from the reaction mixture of the γ-oxo-γ-fluoranthenebutyric acid formed.

References Cited in the file of this patent

UNITED STATES PATENTS 2,560,425   Fancher _____ July 10, 1951